United States Patent
Ramm et al.

(10) Patent No.: US 12,090,868 B2
(45) Date of Patent: Sep. 17, 2024

(54) METHOD AND DEVICE FOR OPERATING A MECHATRONIC SYSTEM WITH A POWER CONVERTER

(71) Applicant: IAV GmbH Ingenieurgesellschaft Auto und Verkehr, Berlin (DE)

(72) Inventors: Hannes Ramm, Hannover (DE); Michael Homann, Vordorf (DE); Alexander Joos, Gifhorn (DE)

(73) Assignee: IAV GmbH Ingenieurgesellschaft Auto und Verkehr, Berlin (DE)

( * ) Notice: Subject to any disclaimer, the term of this patent is extended or adjusted under 35 U.S.C. 154(b) by 503 days.

(21) Appl. No.: 17/446,980

(22) Filed: Sep. 6, 2021

(65) Prior Publication Data
US 2022/0077770 A1  Mar. 10, 2022

(30) Foreign Application Priority Data
Sep. 8, 2020 (DE) .................... 10 2020 123 352.3

(51) Int. Cl.
*H02P 27/08* (2006.01)
*B60L 15/08* (2006.01)
*B60L 53/14* (2019.01)

(52) U.S. Cl.
CPC ............ *B60L 53/14* (2019.02); *B60L 15/08* (2013.01); *H02P 27/085* (2013.01); *B60L 2270/142* (2013.01)

(58) Field of Classification Search
CPC .... B60L 53/14; B60L 15/08; B60L 2270/142; H02P 27/085
See application file for complete search history.

(56) References Cited

U.S. PATENT DOCUMENTS

| 4,629,959 A | 12/1986 | Okuyama et al. |
| 5,610,483 A * | 3/1997 | Obara ............... B60L 15/20 318/432 |

(Continued)

FOREIGN PATENT DOCUMENTS

| DE | 102014108667 A1 | 12/2015 |
| EP | 3059848 B1 | 1/2019 |
| WO | 2018099552 A1 | 6/2018 |

OTHER PUBLICATIONS

Axel Klein et al., Switching Frequency Control for a ΔΣ-PWM, pp. 141-148, PCIM Europe 2018, Jun. 5-7, 2018, Nuremberg, Germany.

(Continued)

*Primary Examiner* — Rina I Duda
(74) *Attorney, Agent, or Firm* — Smartpat PLC

(57) ABSTRACT

The operation of a mechatronic system with a power converter is advantageously and flexibly improved with regard to electromagnetic interference emission and acoustics. A regulation of the instantaneous switching frequency is proposed, with the natural variation of the switching frequency of the delta-sigma PWM in the cycle of the fundamental voltage being taken into account, which can achieve advantages in terms of EMC, acoustics and switching losses. The regulation of the instantaneous switching frequency in particular creates a possibility of generating a specific, calibratable noise with the underlying drive. It can be used to generate a brand-specific, recognizable noise of a vehicle and also to meet normative requirements for the acoustic perceptibility of purely electric vehicles (BEV).

11 Claims, 2 Drawing Sheets

(56) References Cited

U.S. PATENT DOCUMENTS

| | | | | |
|---|---|---|---|---|
| 5,942,876 | A * | 8/1999 | Maekawa | H02M 7/53875 |
| | | | | 318/811 |
| 6,396,933 | B1 * | 5/2002 | Jung | H03F 1/0277 |
| | | | | 330/10 |
| 7,151,354 | B2 * | 12/2006 | Yoshinaga | H02P 29/50 |
| | | | | 318/632 |
| 8,446,221 | B2 * | 5/2013 | Froidevaux | H03F 1/0205 |
| | | | | 330/251 |
| 10,340,813 | B2 | 7/2019 | Schumacher et al. | |
| 2016/0105127 | A1 * | 4/2016 | Miyake | H02M 7/5395 |
| | | | | 363/97 |
| 2016/0248315 | A1 | 8/2016 | Basic et al. | |
| 2017/0179844 | A1 | 6/2017 | Schumacher et al. | |
| 2017/0366130 | A1 * | 12/2017 | Hollenbeck | H02P 27/085 |
| 2018/0123499 | A1 * | 5/2018 | David | H04L 25/03 |

OTHER PUBLICATIONS

Homann, Michael: Hochdynamische Strom- und Spannungsregelung von permanenterregten Synchronmaschinen auf Basis von Delta-Sigma Bitströmen. 2016.

Klein, Axel: Delta-Sigma Signalverarbeitung in der Regelungstechnik. 2019.

* cited by examiner

METHOD AND DEVICE FOR OPERATING A MECHATRONIC SYSTEM WITH A POWER CONVERTER

CROSS-REFERENCE TO RELATED APPLICATION

This application claims the benefit of German Patent Application No. 10 2020 123 352.3, filed Sept. 8th, 2020, the contents of which is hereby incorporated by reference in its entirety.

TECHNICAL FIELD

The present disclosure relates to a method and a device for operating a mechatronic system with a power converter.

BACKGROUND

According to U.S. Pat. No. 10,340,813B2, it is known to operate a mechatronic system that includes a power converter and an electrical machine such that an open or closed loop control of the mechatronic system takes place by means of a delta-sigma pulse width modulator, which provides a pulse width modulation signal with a variable switching frequency. In doing so, actual values are recorded by means of delta-sigma modulators and converted into bit stream signals, and nominal values are specified as bit stream signals. A key feature of this hysteresis-based delta-sigma pulse-width modulator is the variable switching frequency. The above-referenced U.S. Pat. No. 10,340,813B2 is hereby incorporated by reference in its entirety.

A regulation of the instantaneous switching frequency is disclosed in Klein, A.; Thielmann, M.; Schumacher, W.: Switching Frequency Control for a DS-PWM. In: International Exhibition and Conference for Power Electronics, Intelligent Motion, Renewable Energy and Energy Management (PCIM), 2018, pp. 141-148. A control strategy is implemented which contains both the setpoint value of the switching frequency and the actual value of the switching frequency, and a hysteresis limit is used as a controller output of the control loop. The control strategy corresponds to a rule of three (is proportional). The ratio of the actual value of the instantaneous switching frequency of the last PWM cycle to the setpoint of the current switching frequency of the current PWM cycle corresponds to the ratio of the hysteresis limit, which should have been set in order to achieve the desired instantaneous switching frequency, and the hysteresis limit that was actually set. The above-referenced publication by Klein et al. (2018) is hereby incorporated by reference in its entirety.

As described, hysteresis-based pulse pattern methods, such as delta-sigma PWM, automatically generate a variation in the instantaneous switching frequency depending on the operating point and machine parameters. An exemplary curve of the instantaneous switching frequency over the angle of the voltage space vector is shown, for example, in Klein, A.; Thielmann, M.; Schumacher, W.: Switching Frequency Control for a DS-PWM. In: International Exhibition and Conference for Power Electronics, Intelligent Motion, Renewable Energy and Energy Management (PCIM), 2018, S. 141-148, FIG. 7.

Such a varying instantaneous switching frequency is disadvantageous in terms of electromagnetic interference and acoustics during operation. Known solutions do not offer any countermeasures in this regard.

SUMMARY

It is the object of the present invention to make the operation of a mechatronic system with a power converter more advantageous and flexible with regard to electromagnetic interference emission and acoustics.

This object is achieved by a method and a device as claimed.

A regulation of the instantaneous switching frequency is proposed, with the natural variation of the switching frequency of the delta-sigma PWM in the cycle of the fundamental voltage being taken into account. This can achieve advantages in terms of EMC, acoustics and switching losses. The regulation of the instantaneous switching frequency in particular creates a possibility of generating a specific, calibratable noise with the underlying drive. It can be used to generate a brand-specific, recognizable noise of a vehicle and also to meet normative requirements for the acoustic perceptibility of purely electric vehicles (BEV).

The following detailed description is merely exemplary in nature and is not intended to limit the invention or the application and uses of the invention. Furthermore, there is no intention to be bound by any theory presented in the preceding background or the following detailed description.

DETAILED DESCRIPTION

Figure 1:
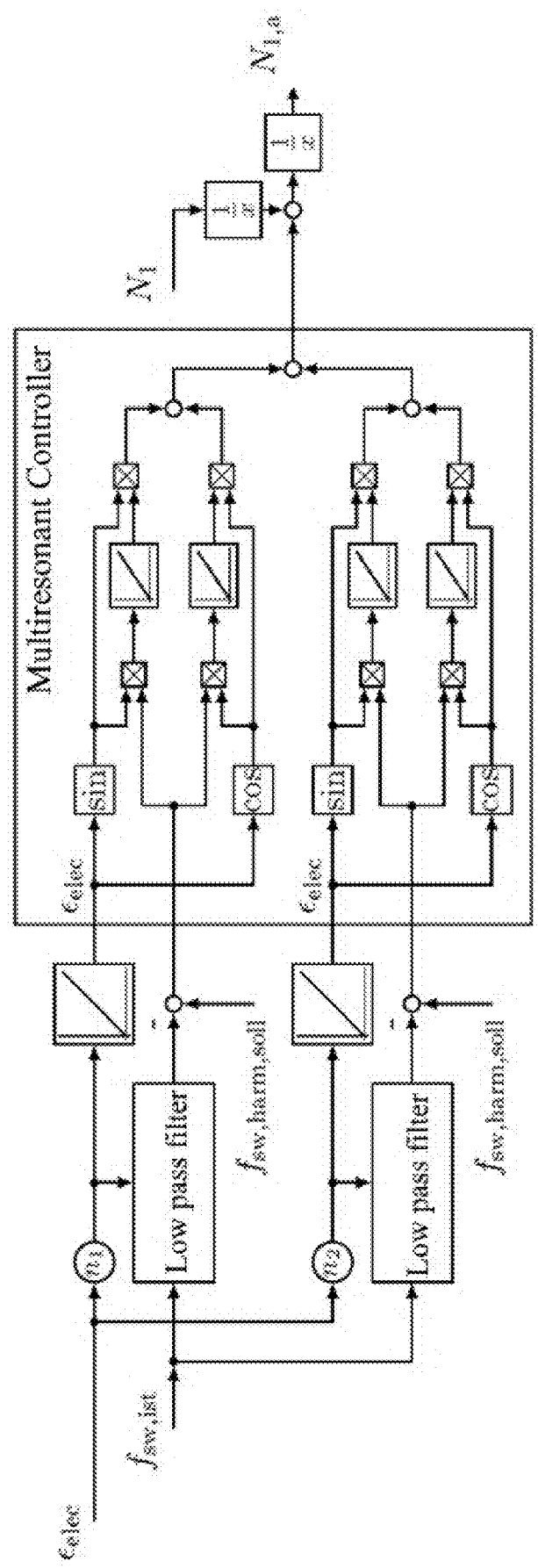
FIG. 1 shows a block diagram of a mechatronic system with a power converter and FIG. 2 the entire mechatronic system (with its individual elements).

Further refinements of the present invention and an illustration of the advantages achieved can be found in the following exemplary embodiment.

To operate a mechatronic system that has a power converter and in particular an electrical machine, which is preferably used to drive a vehicle, the mechatronic system is controlled (open loop control) and/or regulated (closed loop control) by a hysteresis-based pulse width modulator. In particular, a delta-sigma pulse width modulator that provides a pulse width modulation signal with a variable switching frequency may be used. See for details of the hysteresis-based delta-sigma pulse-width modulator Klein, A.; Thielmann, M.; Schumacher, W.: Switching Frequency Control for a DS-PWM. In: International Exhibition and Conference for Power Electronics, Intelligent Motion, Renewable Energy and Energy Management (PCIM), 2018, S. 141-148, FIG. 2 or U.S. Pat. No. 10,340,813B2, which are incorporated herein by reference in their entireties. In this case, actual values are preferably recorded by means of delta-sigma modulators and converted into bit stream signals, and nominal values are specified as bit stream signals. The control and/or regulation of electric drives in particular requires the measurement of state variables such as current and angle as well as the specification of a voltage with adjustable amplitude and frequency. The signal processing of the delta-sigma-PWM takes place in a high-frequency time grid (for example 10 MHz) and the resulting switching frequencies vary in a range of, for example, 4-40 kHz. Depending on the operating point and parameters of the delta-sigma PWM, both a different mean switching frequency and a different spread of the instantaneous switching frequencies around this mean value arise. The instantaneous switching frequency is thus obtained as an additional degree of freedom in the power electronics component, which can be designed in terms of criteria such as power loss or acoustics without having to change the sampling frequency of the digital logic. In order to make optimal use of this advantage, a device is required which sets the instantaneous switching frequency to predetermined setpoints.

With regard to the previous explanations and the explanations below, a distinction is made between the instantaneous switching frequency and an average switching frequency. The instantaneous switching frequency, that is the frequency of a PWM cycle, refers to the reciprocal of the time that is required to return from a start position of the switch of a converter back to this position. In the further course, the cycle bit is used for this, see definition below. The average switching frequency is averaged over a voltage period, i.e. based on the space vector modulation averaged over a rotation of the space vector by 360 degrees, see also the introduction above.

An initial goal is to use a hysteresis-based pulse-width modulator, in particular a delta-sigma pulse-width modulator, which in particular masters (real) space vector modulation with both zero vectors (not shown), to provide the power semiconductor-compatible, instantaneous switching frequency of the pulse width signal at an operating point to influence the modulation signal in a targeted manner. In any case, it is necessary to regulate the current switching frequency, as this has a significant impact on the acoustic behavior of the overall system or drive. See in particular Klein, A.; Thielmann, M.; Schumacher, W.: Switching Frequency Control for a DS-PWM. In: International Exhibition and Conference for Power Electronics, Intelligent Motion, Renewable Energy and Energy Management (PCIM), 2018, S. 141-148. The result at the output of a controller is a manipulated variable in the form of the hysteresis limit $N_1$, which influences the switching frequency $f_{sw}$, since a switching event is triggered by exceeding this hysteresis limit $N_1$. The hysteresis limits $N_0$ and $N_2$ can also be calculated from the first hysteresis limit $N_1$.

It is useful or necessary to regulate the instantaneous switching frequency, since it has a decisive influence on the frequency spectrum of the phase currents generated by the power converter. These, in turn, contribute to the emission of electromagnetic interference and make a significant contribution to the acoustic behavior of the electrical machine.

In the case of a power converter with three phases the instantaneous switching frequency has six times the frequency of the electrical fundamental oscillation of the electrical machine and other harmonics. In addition, a stochastic component from a non-ergodic random process is superimposed. That is, the characteristic random variables are time-variable. Therefore, the 6-fold frequency of the basic electrical oscillation of the load/machine is first considered here and the stochastic component is neglected for the control.

An essential aspect of regulating the instantaneous switching frequency of a power converter is consequently the regulation of an n- or, in particular, 6-fold instantaneous switching frequency with a harmonic resonator and the subsequent impression of any harmonic signals with multi-resonant integrators/multiresonant controllers, as shown in FIG. 1.

The goal is that predetermined harmonics $f_{sw,harm,soll}$ should be superimposed on a mean switching frequency, whereby the instantaneous switching frequency $f_{sw,ist}$ is being made available in FIG. 1 at the input of the multi-resonant controller in addition to the electrical angle $\varepsilon_{elec}$. According to FIG. 1 two multi-resonant controllers in parallel are shown. The mean switching frequency is regulated by a separate controller. Such a controller is disclosed, for example, in U.S. Pat. No. 10,340,813B2, which is hereby incorporated by reference in its entirety. The specified harmonics $f_{sw,harm,soll}$ represent/provide specified requirements with regard to the acoustics of the mechatronic system(s).

The instantaneous switching frequency $f_{sw,ist}$ results, for example, from the rising edges of a cycle bit ZB. For this purpose, an integrator (not shown) counts the time value of a sampling step per sampling period. The rising edge of the cycle bit ZB triggers a reset of the integrator and a memory (both not shown in FIG. 1) into which the last output value of the integrator is written. Thereby the instantaneous switching frequency $f_{sw,ist}$ of the previous PWM cycle is output during a PWM period.

With regard to the cycle bit ZB, reference is made to its definition in U.S. Pat. No. 10,340,813B2, namely that the cycle bit ZB indicates whether the space vector modulation is in the first or second half period of the PWM cycle. In particular, the cycle bit ZB provides a valid statement about the current (instantaneous) switching frequency even in the case of partial or complete overmodulation.

The electrical angle $\varepsilon_{elec}$ (angle of the three-phase current field in the electrical machine or angle of the space or nominal voltage vector) is usually determined by a rotor position encoder. There are also options for determining the electrical angle without a rotor position encoder.

However, the output or the manipulated variable of the multi-resonant controller or merged/joined manipulated variables of various parallel multi-resonant controllers, see FIG. 1, is/are not applied directly to a (manipulated) variable to be influenced, namely a (first) hysteresis limit $N_1$. It should be noted, that for the inventive regulation of the instantaneous switching frequency $f_{sw}$, a stationary operating point for the mean switching frequency must also be set (via a further controller, see FIG. 2), in particular by means of a manipulated variable (hysteresis limit) $N_1$. Such a setting or regulation of a stationary operating point for the mean switching frequency can occur as described in U.S. Pat. No. 10,340,813B2.

It is now essential that the relationship between the instantaneous switching frequency and the hysteresis limit $N_1$ is reciprocal and thus non-linear, so that sensible operation of the multiresonant controller is initially still prevented.

The manipulated variable $N_1$ (hysteresis limit) from the additional controller (see FIG. 2) relating to the average switching frequency must therefore be applied reciprocally (1/x) to the manipulated variable (not shown in more detail in FIG. 1) of the multiresonant controller. The sum of the manipulated variable of the multiresonant controller and the reciprocal manipulated variable $N_1$ must in turn be calculated reciprocally (1/x) or processed further in order to do justice to the original non-linear relationship, see FIG. 1, with the result being a corrected or new hysteresis limit $N_{1,a}$.

The (new) hysteresis limit $N_{1,a}$ determined in this way now causes a momentary switching frequency with the desired (harmonic) oscillations. This has a positive effect on the acoustics and can be calibrated before series production of this system, in particular through the targeted selection of the multi-resonant controller(s), especially in the development phase of the mechatronic system.

With this regulation of the instantaneous switching frequency, as described in connection with a regulation of the mean switching frequency, the spread of the instantaneous switching frequency can be set as desired. This is an additional degree of freedom in terms of acoustics and EMC.

Through the reciprocal superimposition of a multiresonant controller/several multiresonant controllers, sinusoidal curves of the instantaneous switching frequency are generated. In summary, this reciprocal superimposition is advantageous for every method for switching frequency control of a hysteresis-based PWM method for setting a sinusoidal profile.

To achieve the greatest possible flexibility of the acoustic properties of the mechatronic system it is on the one hand possible during the operation of the mechatronic system to provide the reciprocal superimposition (of a manipulated variable) of a multiresonant controller to the manipulated variable of a further controller, which is provided for setting an average switching frequency. Further it is possible to influence the formation of the manipulated variable of the multi-resonant controller, in particular by changing properties or parameters of the multi-resonant controller. This is achieved in particular by setting the specified harmonics $f_{sw,harm,soll}$ or by replacing the multi-resonant controller with another multiresonant controller or by adding one or more further multiresonant controllers to the already active multiresonant controller. A result is the reciprocal superimposition (one manipulated variable or several manipulated variables) of one (or more) multiresonant controller(s) to the manipulated variable of a further controller (for setting the average switching frequency) in such a way that a desired specific acoustic behavior of the mechatronic system is achieved.

Influencing the manipulated variable(s) or influencing the formation of the manipulated variable(s) of the multiresonant controller(s) or the selection of one or more multiresonant controller(s) to generate one or more manipulated variable(s), which is/are superimposed reciprocally to the manipulated variable $N_1$ (hysteresis limit) from the additional controller relating to the average switching frequency in the further course, takes place in particular during the operation of the mechatronic system depending on specified requirements (e.g. at least one corresponding setpoint or at least one corresponding input variable) with regard to the acoustics of the mechatronic system. With regard to the sound emitted by the mechatronic system to the environment, these specified requirements also (indirectly) depend on the operating conditions of the mechatronic system or a vehicle with this mechatronic system or alternatively or additionally depend on its environmental conditions. They for example depend on signals from sensors that relate to the environment of the mechatronic system/vehicle, so that road users can be warned in particular by the change in acoustics. Of course, control can also take place so that, for example, at a low speed (input variable) of an electrical machine, a more distinctive or more perceptible sound is produced, and at a higher speed, maximum attenuation of the acoustic events caused by the variation of the current switching frequency takes place. A dependency on specified requirements with regard to the acoustics of the mechatronic system is also present if such requirements with regard to acoustics are specified in the context of the development of the mechatronic system, so to speak hardcoded, i.e. if the mechatronic system is provided or calibrated with a specific acoustic behavior that can no longer be changed during operation.

Figure 2:
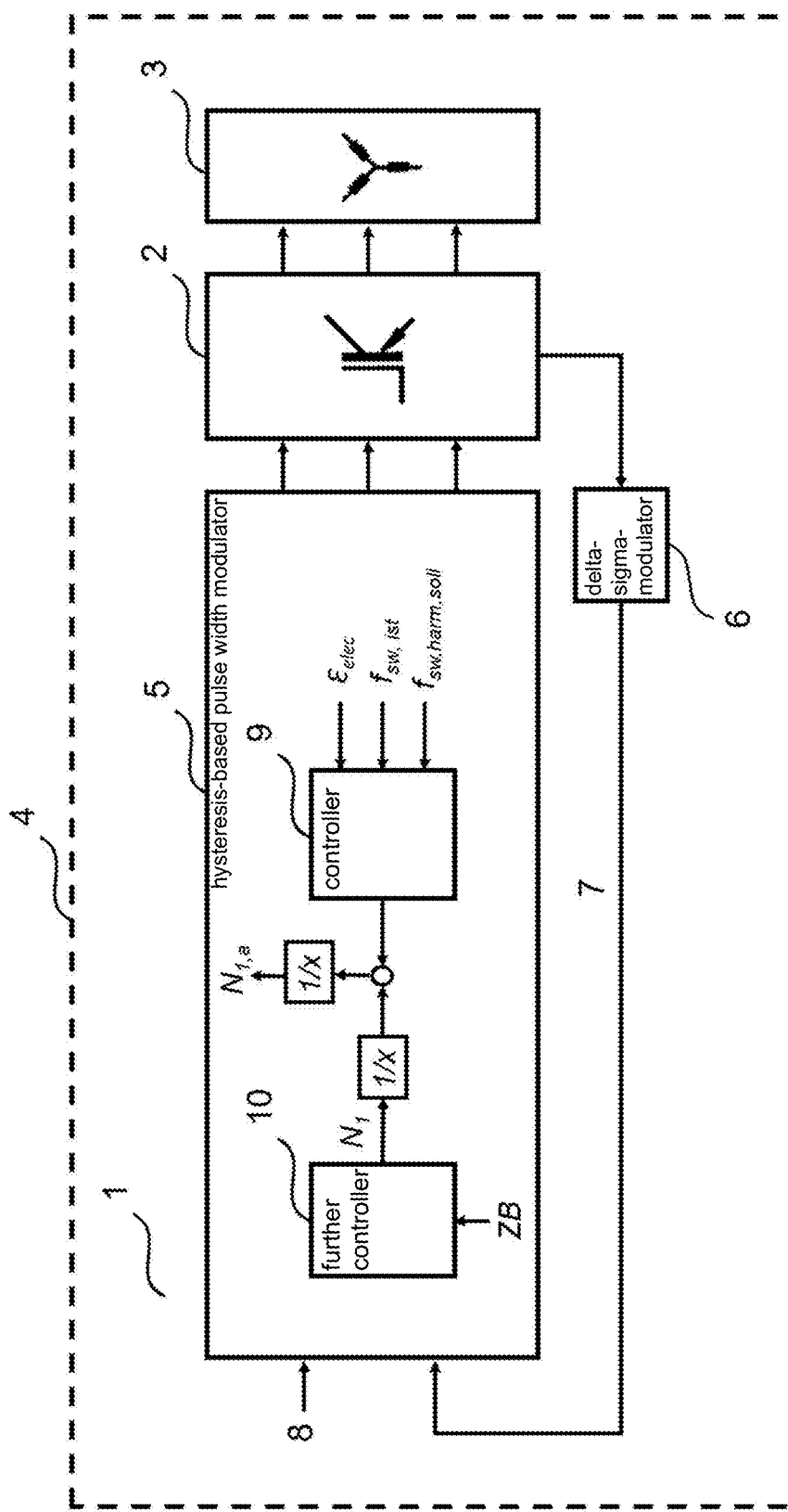

FIG. 2 shows in summary the mechatronic system 1 as described above comprising a power converter 2 with three phases and in particular an electric machine 3, preferably as a driving system 4 of a vehicle. The control (open loop and/or closed loop) of the mechatronic system 1 takes place by means of a hysteresis-based pulse-width modulator 5, as described in detail in the U.S. Pat. No. 10,340,813B2, in particular by means of a delta-sigma pulse-width modulator, which provides pulse-width modulated signals/switching signals with a variable switching frequency.

In doing so, preferably by delta-sigma-modulators 6, actual values 7 (in particular current and/or voltage) will be detected/captured and converted into bitstreams as well as corresponding target values 8 will be provided by bitstreams.

According to the present invention a hysteresis limit $N_1$ will be influenced by a controller 9, in particular a multiresonant controller or various multi-resonant controllers in parallel, as shown in FIG. 1, namely depending upon an actual value of the instantaneous switching frequency $f_{sw,ist}$ and depending upon prescribed/specified requirements regarding the acoustics of the mechatronic system 1, for example prescribed/specified harmonics $f_{sw,harm,soll}$ as well as depending upon the electrical angle $\varepsilon_{elec}$.

The hysteresis limit $N_1$ represents the manipulated/correcting variable of a further controller 10. By means of the further controller 10 an average/a mean switching frequency will be adjusted, depending upon a cycle bit ZB, as described in U.S. Pat. No. 10,340,813B2.

The manipulated/correcting variable $N_1$ (hysteresis limit) of the further controller 10 will be applied, that means superimposed, reciprocally (1/x) to the manipulated variable of the multi-resonant controller 9. The sum of the manipulated variable of the multi-resonant controller and the reciprocal manipulated variable $N_1$ must in turn be calculated reciprocally (1/x) or processed further in order to do justice to the original non-linear relationship, with the result being a corrected or new hysteresis limit $N_{1,a}$.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A method for operating a mechatronic system with a power converter, comprising:
   providing a pulse width modulation signal with a variable switching frequency by a hysteresis-based pulse width modulator;
   influencing a hysteresis limit by a controller
      as a function of an actual value of an instantaneous switching frequency and
      as a function of a harmonic frequency of the mechatronic system.

2. The method according to claim 1,
   wherein the controller corresponds to a harmonic resonator with an impression of harmonic signals with multi-resonant integrators and thus a multi-resonant controller.

3. The method according to claim 1,
   wherein the influencing of the hysteresis limit takes place in that a manipulated variable of the controller is superimposed to the hysteresis limit or the hysteresis limit is superimposed to a manipulated variable of the controller.

4. The method according to claim 1,
   wherein the hysteresis limit is a manipulated variable of a further controller with which an average switching frequency is set.

5. The method according to claim 4,
wherein a reciprocal superimposition of a manipulated variable of the controller to the hysteresis limit or a reciprocal superimposition of the hysteresis limit to a manipulated variable of the controller takes place.

6. The method according to claim 1,
wherein the harmonic frequency of the mechatronic system is specified during operation of the mechatronic system by one or more of:
providing harmonics to a multiresonant controller,
replacing a multi-resonant controller by another multi-resonant controller, and
activating one or more further multiresonant controller(s) in addition to an active multiresonant controller.

7. The method according to claim 1,
wherein the harmonic frequency is predetermined during development of the mechatronic system, before a series application.

8. The method according to claim 1, further comprising setting the harmonic frequency as a function of operating conditions of the mechatronic system and/or as a function of ambient conditions of the mechatronic system.

9. A mechatronic system with a power converter,
wherein the mechatronic system is operated in accordance with the method as in claim 1.

10. The mechatronic system according to claim 9, wherein the mechatronic system comprises an electrical machine.

11. A vehicle, comprising the mechatronic system according to claim 9.

* * * * *

UNITED STATES PATENT AND TRADEMARK OFFICE
CERTIFICATE OF CORRECTION

| | |
|---|---|
| PATENT NO. | : 12,090,868 B2 |
| APPLICATION NO. | : 17/446980 |
| DATED | : September 17, 2024 |
| INVENTOR(S) | : Hannes Ramm, Michael Homann and Alexander Joos |

It is certified that error appears in the above-identified patent and that said Letters Patent is hereby corrected as shown below:

In the Claims

Column 7, Lines 23 to 25, Claim 9 "A mechatronic system with a power converter, wherein the mechatronic system is operated in accordance with the method as in claim 1." should read
--A mechatronic system, comprising:
a hysteresis-based pulse-width modulator including a controller; and
a power converter;
wherein the hysteresis-based pulse-width modulator is configured to provide a pulse width modulation signal with a variable switching frequency, and
wherein the controller is configured to influence a hysteresis limit of the hysteresis-based pulse-width modulator as a function of an actual value of an instantaneous switching frequency and
as a function of a harmonic frequency of the mechatronic system.--

Column 7, Line 27, Claim 10 "system comprises" should read --system further comprises--

Column 7, Lines 29 and 30, Claim 11 "A vehicle, comprising the mechatronic system according to claim 9." should read
--A vehicle, comprising
a hysteresis-based pulse-width modulator including a controller;
a power converter; and
an electric vehicle drive motor,
wherein the hysteresis-based pulse-width modulator is configured to provide a pulse width modulation signal with a variable switching frequency, and
wherein the controller is configured to influence a hysteresis limit of the hysteresis-based pulse-width modulator as a function of an actual value of an instantaneous switching frequency and
as a function of a harmonic frequency.--

Signed and Sealed this
Twenty-fifth Day of March, 2025

Coke Morgan Stewart
*Acting Director of the United States Patent and Trademark Office*